CARL J. PIHL (NOW BY JUDICIAL CHANGE OF NAME CARL JOHN PIEL).
FRICTION DEVICE.
APPLICATION FILED SEPT. 24, 1920.
1,420,281.
Patented June 20, 1922.
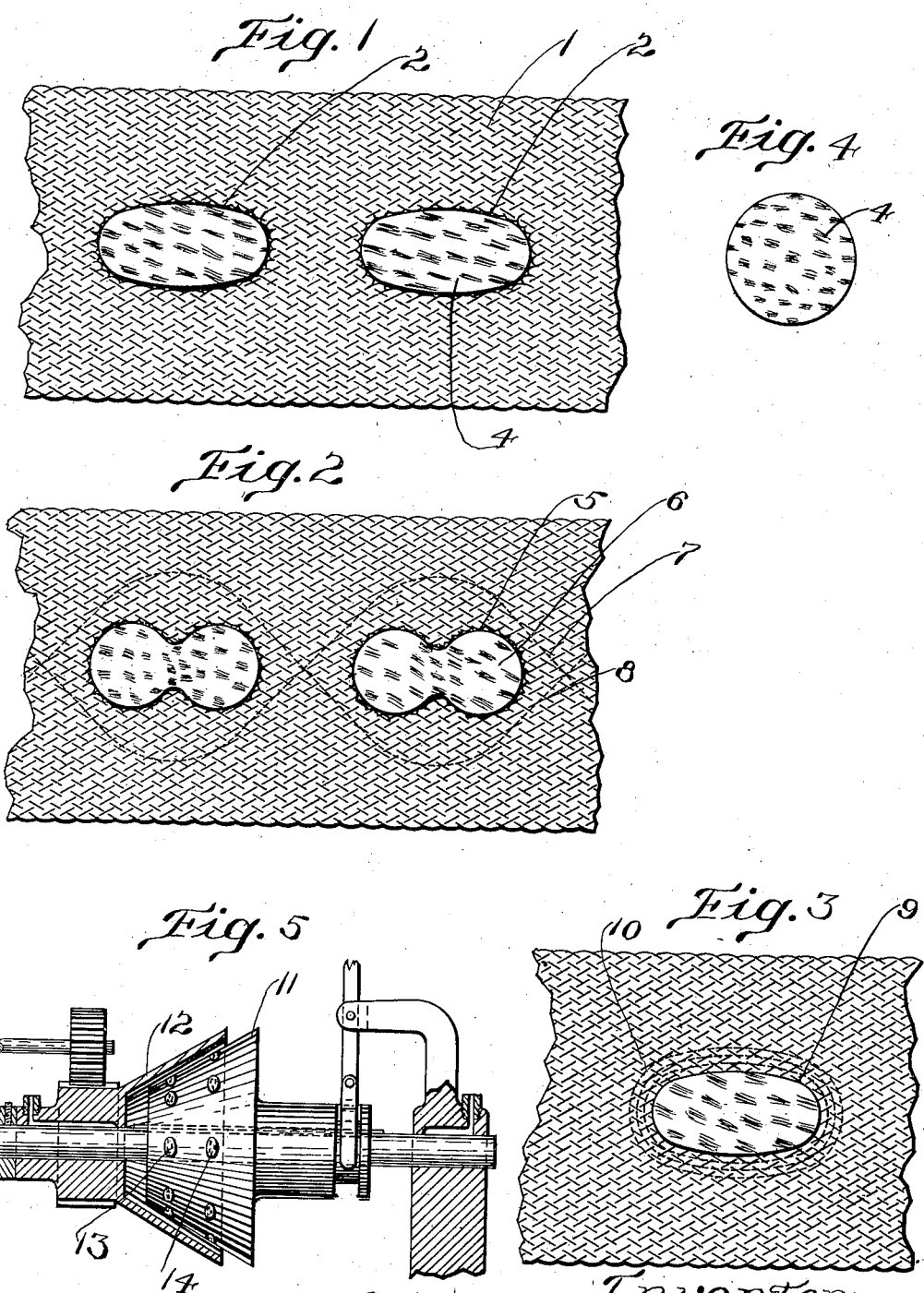

UNITED STATES PATENT OFFICE.

CARL J. PIHL (NOW BY JUDICIAL CHANGE OF NAME CARL JOHN PIEL), OF BOSTON, MASSACHUSETTS.

FRICTION DEVICE.

1,420,281. Specification of Letters Patent. Patented June 20, 1922.

Application filed September 24, 1920. Serial No. 412,465.

*To all whom it may concern:*

Be it known that I, CARL JOHN PIEL (formerly CARL J. PIHL), a citizen of the United States of America, and resident of Boston, in the county of Suffolk and State of Massachusetts, have invented new and useful Improvements in Friction Devices, of which the following is a specification.

This invention relates to friction devices of that type commonly employed for imparting movement to or retarding the movement of a movable element. Stated more specifically, the device forming the subject matter of this invention relates to friction devices adapted for use in the clutches or brakes of motor vehicles and particularly to that type of such devices comprising base members serving to support independent friction elements.

One advantage accruing from the use of such composite friction devices consists in the possibility of employing as a base member a material capable of sustaining the longitudinal stresses incident to the employment of such a friction device, while the independent friction elements may be of a material best suited for producing the desired frictional engagement with the opposing part. Difficulty has been experienced however, in the use of such composite friction devices in providing for the certain retention of the friction members in the base member, except by the employment of complicated and expensive holding means, the disadvantages of which are sufficient in many cases to debar them from commercial use.

An object of the present invention is to provide such a composite friction device which shall be of simple construction, readily capable of withstanding the stresses to which it is subjected in use, and which at the same time furnishes certain and inexpensive means for securing the friction members to the base member.

As one mode of attaining this object the base member may comprise a relatively strong and strain resistant material having a series of openings or sockets therein, within which sockets may be seated plugs of a friction material preferably inserted within said openings while in a compressed state, the expansion of the friction material after insertion in the openings serving in most cases as an efficient means for retaining such plugs in operative position, while at the same time permitting their ready removal for renewal when desired.

In accordance with this mode of attaining the object of the invention, a preferred form of base member may consist of a strip of textile or other woven or braided material, having openings spaced longitudinally of the same within which the plugs or inserts of friction material may be seated. The openings in the fabric may if desired, be produced during fabrication thereof, thus providing selvaged edges for the openings, or such openings may be formed subsequently to the manufacture of the material and if desired re-enforced about their edges in any desired manner as for example by one or more rows of stitches.

When strips of textile fabric are employed as brake linings, it is frequently found that when subjected to the longitudinal strains incident to use, they quickly decrease in width, thus failing to cover the entire surface of the parts with which they cooperate. This narrowing of the strip is due to the longitudinal strain placed thereon and is highly objectionable as it tends to interfere with the proper operation of the strip as a brake or clutch element. A secondary object of the present invention is to provide means which normally tends to oppose such narrowing of the strip in use. To this end, the arrangement above described subserves to a certain extent and as a mode of making such arrangement more efficient for the last stated purpose, the insertions of the friction material may be formed of a fibrous and resilient material, such for example, as cork which before insertion in the opening in the fabric strip will be compressed in a direction transverse to the length of the strip. Under such circumstances the resiliency of the friction member serves to oppose any narrowing of the fabric strip when subjected to longitudinal tension.

In devices of this character, it is desirable to have the friction member present as large a contacting surface as possible without weakening the base member or fabric strip to too great an extent.

One object of the present invention is to provide a friction device of the type referred to in which the friction elements shall present a maximum of friction surface without diminishing the strength of the fabric strip to an objectionable extent. The openings in the fabric strip may be elongated in the direction of the length of the strip, thus providing a relatively large friction area for the friction plugs inserted in said openings, while at the same time maintaining the area of the cross section of the fabric strip as large as possible.

While the term fabric strip has been employed above, it is to be understood that any material whether flexible or rigid having the desired characteristics may be employed as the base member for supporting the friction members and that various shapes of openings may be employed, provided such openings be of a form consistent with the carrying out of the objects of the invention.

It is furthermore to be noted that while the friction members have been referred to as of fibrous resilient material they may in certain uses of the invention comprise materials not conspicuous for such physical qualities, providing the material is of a character to permit the objects of the invention to be obtained by its use.

A preferred embodiment of the invention is disclosed in the accompanying drawings, in which—

Figure 1 is a plan view of a section of brake lining having openings of substantially elliptical form therein.

Figure 2 is a view similar to Fig. 1, but illustrating the employment of openings having an outline substantially that of a lemniscate.

Figure 3 is a view similar to Fig. 1, but showing the opening as re-enforced by means of several rows of stitches surrounding the same.

Figure 4 is a plan view of a friction plug suitable for insertion in an opening in the form shown in Fig. 1, but showing the shape thereof before compression, and Figure 5 is a sectional view of a cone clutch showing the adaptation of one form of the invention thereto.

In Fig. 1, 1 is a strip of textile fabric herein shown as woven and having a series of openings 2 formed therein during the process of manufacture, such openings being thus provided with selvaged edges whereby ravelling of the same is avoided. The openings of the device shown in Fig. 1 are of elongated form and of substantially elliptical outline, the major axes of said openings being substantially coincident with the longitudinal center line of the fabric strip. The openings 2—2, are spaced apart longitudinally of the fabric strip to an extent found to be desirable by practical experiment and within such openings are seated plugs 4 of cork or other suitable friction material.

In Fig. 4, such a plug is illustrated in its original condition, while in Fig. 1 such plug has been subjected to compression in a direction transversely of the length of its grain, whereby it is brought to a substantially elliptical form permitting its insertion within an opening 2. By reason of the transverse compression of the resilient plug, there is a tendency of the same to exert a side thrust outwardly from the opening toward the edges of the fabric strip and such thrust is of value in opposing the tendency of the strip to diminish in width and become elongated when the strip is subjected to longitudinal strain in use. While a plug of compressed cork is particularly desirable for use in a brake lining when such brake lining is employed in motor vehicle practice, it is evident that other materials having similar characteristics may be substituted therefore. By the formation of selvaged edges about the openings, the edges are strengthened and made more rigid and thus the openings constitute what may be termed sockets which grip and securely hold the edges of the compressed plugs when the latter are inserted therein.

In the arrangement shown in Fig. 2, the openings while still of elongated form in the direction of length of the fabric strip are of an outline substantially that of a lemniscate. Openings of this form are particularly well adapted for holding the plugs securely in position and for preventing the ready disengagement of the same from the socket openings. In Fig. 2 the openings are indicated at 5 and the plugs at 6 and as an additional means for re-enforcing the openings and preventing the ravelling of the edges of the same, rows of stitches 7, 8 may be employed, such stitches being such as are formed by an ordinary sewing machine and applied to the fabric after it is manufactured.

In Fig. 3, the opening is indicated at 9 and the plug at 10, the opening there being indicated as punched in the finished fabric and of substantially elliptical form the edges of the opening being re-enforced by a plurality of rows of stitches 10.

In all of the arrangements heretofore described, the friction plug is embedded within the thickness of the fabric strip and while under some circumstances it may project to same distance at opposite sides thereof, in its preferred form such plug in the normal position of the parts will have its opposite ends lying substantially in the planes of the opposite surfaces respectively of the fabric strip. When so arranged, upon subjection of the fabric strip or band to tension, the thickness of the latter will be decreased sufficiently to permit the plug members to project a proper distance from the surface of such band to enable them to function properly in cooperating with the opposing friction elements.

In Fig. 5, 11 is the conical element of a cone clutch, the cooperating element thereof being indicated at 12, such clutch being of usual construction and operated in usual manner, except in so far as hereinafter described. Formed in the conical surface of the member 11, are one or more series of circumferentially elongated openings 13 spaced circumferentially thereof, such openings having seated therein friction plugs 14. Such friction plugs may be of any desired friction material, but will preferably be formed of cork or other suitable organic substance which before insertion in the opening will be compressed, whereby when seated in the opening the natural resiliency of the plug will serve to maintain it in operative position therein.

Having now described the invention in a preferred embodiment of the same, together with the mode or use thereof, what I claim and desire to secure by Letters Patent of the United States is:

1. In a friction device, a base member having a longitudinally extending series of openings therein, and a plug of cork compressed transversely of its grain and seated in each of said openings, said plugs having their ends lying substantially flush with the adjacent surface of said base.

2. A brake lining comprising a base of textile fabric having openings spaced longitudinally thereof, and laterally compressed plugs of resilient material seated in said openings.

3. A brake lining comprising a strip of sheet material having openings therethrough and spaced longitudinally thereof, and laterally compressed inserts of resilient material filling said openings and having their opposite ends substantially in the planes of the respective sides of said strip.

4. A brake lining comprising an elongated strip of textile fabric having a series of spaced sockets therein and a laterally compressed plug of cork seated in each of said sockets.

5. A friction element comprising an elongated strip of textile fabric having a longitudinally extending series of openings therein, said openings being elongated in the direction of length of said strip, and a plug of cork seated in each of said openings, said cork being compressed in a direction transverse to the length of said openings whereby to resist transverse narrowing of the strip when subjected to longitudinal tension.

Signed by me at Boston, Massachusetts, this twenty-second day of September 1920.

CARL JOHN PIEL, Formerly
CARL J. PIHL.